(12) United States Patent
Ideguchi et al.

(10) Patent No.: US 12,360,863 B2
(45) Date of Patent: Jul. 15, 2025

(54) INFORMATION PROCESSING DEVICE, INFORMATION PROCESSING METHOD, PROGRAM, AND STORAGE MEDIUM

(71) Applicant: HITACHI ASTEMO, LTD., Hitachinaka (JP)

(72) Inventors: Kota Ideguchi, Tokyo (JP); Takashi Yamaguchi, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 5 days.

(21) Appl. No.: 18/549,942

(22) PCT Filed: Feb. 22, 2022

(86) PCT No.: PCT/JP2022/007396
§ 371 (c)(1),
(2) Date: Sep. 11, 2023

(87) PCT Pub. No.: WO2022/224582
PCT Pub. Date: Oct. 27, 2022

(65) Prior Publication Data
US 2024/0152441 A1    May 9, 2024

(30) Foreign Application Priority Data
Apr. 23, 2021    (JP) ................... 2021-073241

(51) Int. Cl.
*G06F 11/00*    (2006.01)
*G06F 11/14*    (2006.01)
(Continued)

(52) U.S. Cl.
CPC .......... *G06F 11/1629* (2013.01); *G06F 11/14* (2013.01); *G06F 11/16* (2013.01); *G06F 11/3466* (2013.01); *G06F 11/3476* (2013.01)

(58) Field of Classification Search
CPC ...... G06F 11/14; G06F 11/16; G06F 11/1629; G06F 11/3466; G06F 11/3476
See application file for complete search history.

(56) References Cited

U.S. PATENT DOCUMENTS

| | | | | |
|---|---|---|---|---|
| 8,850,263 | B1 * | 9/2014 | Yourtee | G06F 11/3476 714/20 |
| 11,455,219 | B2 * | 9/2022 | Pasupuleti | G06F 11/2028 |

(Continued)

FOREIGN PATENT DOCUMENTS

| | | |
|---|---|---|
| EP | 3 771 981 A1 | 2/2021 |
| JP | 2007-108929 A | 4/2007 |

(Continued)

OTHER PUBLICATIONS

International Search Report with English Translation and Written Opinion of International Patent Application No. PCT/JP2022/007396 dated May 17, 2022 (8 pages).

(Continued)

*Primary Examiner* — Joshua P Lottich
(74) *Attorney, Agent, or Firm* — Foley & Lardner LLP

(57) ABSTRACT

Provided is an information processing apparatus that allows a plurality of systems to efficiently share information regarding an alert. An information processing apparatus includes an ID assigning computer that assigns a log ID to collected log data of a device, a first processing computer that stores the log data and the log ID and detects an abnormality based on the log data, and a second processing computer that stores the log data and the log ID, detects an abnormality based on the log data, and transmits the log ID of the log data in which the abnormality is detected and a detection result of the abnormality to the first processing computer. The first processing computer stores the log data stored in the first processing computer and the received detection result in (Continued)

association with each other based on the log ID received from the second processing computer.

6 Claims, 15 Drawing Sheets

(51) Int. Cl.
    *G06F 11/16*         (2006.01)
    *G06F 11/34*         (2006.01)

(56)                 References Cited

U.S. PATENT DOCUMENTS

| | | | |
|---|---|---|---|
| 11,461,163 B1* | 10/2022 | Aggarwal | G06F 11/0787 |
| 2005/0240793 A1* | 10/2005 | Safford | G06F 9/3851 |
| | | | 714/1 |
| 2018/0307576 A1 | 10/2018 | Debnath et al. | |
| 2021/0226974 A1 | 7/2021 | Hirano et al. | |
| 2022/0206066 A1* | 6/2022 | Hihara | G01R 31/28 |
| 2022/0308539 A1* | 9/2022 | Kalleppally | B60W 50/023 |

FOREIGN PATENT DOCUMENTS

| | | |
|---|---|---|
| WO | WO-2016/075915 A1 | 5/2016 |
| WO | WO-2020/110415 A1 | 6/2020 |
| WO | WO-2020/255512 A | 12/2020 |

OTHER PUBLICATIONS

Extended European Search Report issued in corresponding EP Patent Application No. 22791364.7, dated Mar. 6, 2025 (8 pages).

\* cited by examiner

FIG. 5

LOG STORAGE DB
211

| COLLECTION TIME (501) | LOG ID (502) | LOG DATA (503) |
|---|---|---|
| 2020-04-01T12:00:01Z | 00000001 | {VIN:1234567890ABCDEFG, ECU: Engine, ...} |
| 2020-04-01T12:00:05Z | 00000002 | {VIN:2234567890ABCDEFG, ECU: AD, ...} |
| 2020-04-01T12:00:07Z | 00000003 | {VIN:3234567890ABCDEFG, ECU: TCU, ...} |
| 2020-04-01T12:00:09Z | 00000004 | {VIN:1234567890ABCDEFG, ECU: Engine, ...} |
| : | : | : |

FIG. 6

ANALYZED LOG STORAGE DB
311

(MAXIMUM NUMBER OF RECORDS = 5)

| COLLECTION TIME (601) | LOG ID (602) | VIN (603) | ECU (604) | Engine RPM (605) |
|---|---|---|---|---|
| 2020-04-01T12:00:01Z | 00000001 | 1234567890ABCDEFG | Engine | 2435 |
| 2020-04-01T12:00:09Z | 00000004 | 2234567890ABCDEFG | Engine | 1502 |
| : | : | : | : | : |

ALERT DB 312

| DETECTION TIME (701) | ALERT ID (702) | ALERT CONTENT (703) | RELATION LOG (704) |
|---|---|---|---|
| 2020-04-01T12:00:09Z | A0000001 | Ilegal value of RPM | 0000001, 0000004 |
| 2020-04-01T12:00:20Z | A0000002 | Multiple failures of authentication | 0000007, 0000010, 0000015 |
| : | : | : | : |

INFORMATION PROCESSING DEVICE, INFORMATION PROCESSING METHOD, PROGRAM, AND STORAGE MEDIUM

TECHNICAL FIELD

The present invention relates to an information processing apparatus, an information processing method, a program, and a storage medium, and relates to, for example, analysis and sharing of data in a server system.

BACKGROUND ART

With the progress of IoT in which all things are connected to the Internet, ensuring the security of IoT devices is one of the important social challenges. In particular, in a case where an IoT device is an automobile such as a connected car or an autonomous driving car, there is a case where human safety is threatened by the vehicle being subjected to a security attack. Accordingly, a technology for minimizing such safety damage is required.

As a measure to minimize the damage of cyberattack on a vehicle, there is a security operation center for automobiles, which monitors a log transmitted from an automobile with a server, detects a cyberattack on the automobile, and handles the attack.

Conventionally, a security operation center has been introduced as a countermeasure against cyberattacks on an IT system in a company or the like. Unlike this conventional security operation center, a security operation center for automobiles is a security operation center for automobiles, which monitors connected cars, automatic driving cars, and systems including a server system, a mobile terminal, and the like connected to these cars. It may also be referred to as a Vehicle Security Operation Center (VSOC).

PTL 1 discloses a system that adds classification information to an alert generated in a monitoring system in a security operation center on the basis of an evaluation result of the alert, thereby accurately evaluating the alert and enabling stable and safe operation of a monitoring target system.

In the security operation center, a security information event management (SIEM) system is used as an example of a system that integrates and analyzes various security events and logs. For a conventional security operation center for IT systems, there are many SIEM products that are already proven. However, for a security operation center for automobiles, there are few SIEM products that are proven. For this reason, in the security operation center for automobiles, there is a case where SIEM having detection rules and the like made for automobiles but having no track record is used in combination with SIEM having a track record for IT systems.

CITATION LIST

Patent Literature

PTL 1: WO 2020/255512 A

SUMMARY OF INVENTION

Technical Problem

However, the conventional technique has a problem that it is difficult to efficiently share information regarding an alert among a plurality of SIEM systems.

When a security operation center is constructed by combining a plurality of SIEM systems, a method of sharing an alert issued by one SIEM system with other SIEM systems is required. However, since a log of a monitoring target, an analysis method thereof, and a method of holding an analysis result differ for each SIEM system, even if only alert information is shared among a plurality of SIEM systems, it is difficult for the system that has received the alert to sufficiently utilize the information.

For example, according to PTL 1, a system for accurately evaluating an alert by adding an identifier associated therewith and classification information based on an evaluation result to the alert is constructed, but PTL 1 does not provide a mechanism for sharing an alert and an identifier or classification information associated therewith in a form that can be utilized among a plurality of systems.

The present invention has been made to solve such a problem, and an object thereof is to provide a technology that allows a plurality of systems to efficiently share information regarding an alert.

Solution to Problem

An example of an information processing apparatus according to the present invention includes an ID assigning computer that assigns a log ID to collected log data of a device, a first processing computer that stores the log data and the log ID and detects an abnormality based on the log data, and a second processing computer that stores the log data and the log ID, detects an abnormality based on the log data, and transmits the log ID of the log data in which the abnormality is detected and a detection result of the abnormality to the first processing computer. The first processing computer stores the log data stored in the first processing computer and the received detection result in association with each other based on the log ID received from the second processing computer.

An example of an information processing method of the present invention includes a step of causing an ID assigning computer to assign a log ID to collected log data of a device, a step of causing a first processing computer to store the log data and the log ID, a step of causing the first processing computer to detect an abnormality based on the log data, a step of causing a second processing computer to store the log data and the log ID, a step of causing the second processing computer to detect an abnormality based on the log data, a step of causing the second processing computer to transmit the log ID of the log data in which an abnormality is detected and a detection result of the abnormality to the first processing computer, and a step of causing the first processing computer to store the log data stored in the first processing computer and the received detection result in association with each other based on the log ID received from the second processing computer.

The present specification includes the disclosure of Japanese Patent Application No. 2021 073241 on which priority of the present application is based.

Advantageous Effects of Invention

According to the technology according to the present invention, information regarding an alert can be efficiently shared among a plurality of systems.

For example, among a plurality of data analysis systems using SIEM as an example, it is possible to share information of an alert issued by one data analysis system and its related log with a small amount of communication data in a form that can be utilized by other data analysis systems.

BRIEF DESCRIPTION OF DRAWINGS

FIG. 5 illustrates the configuration of a log storage DB.

FIG. 6 illustrates the configuration of an analyzed log storage DB.

DESCRIPTION OF EMBODIMENTS

Figure 1:
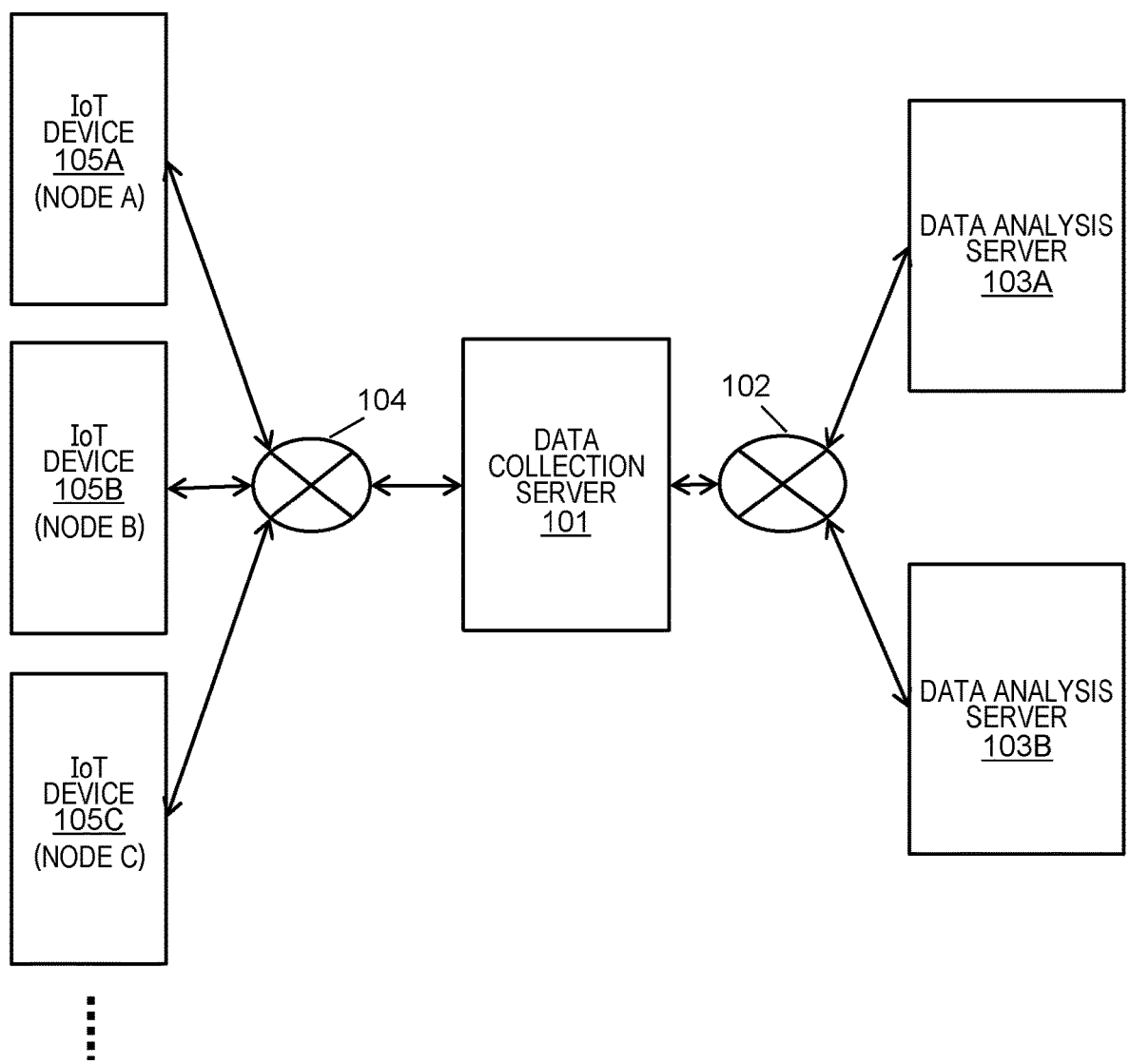
FIG. 1 illustrates the configuration of a client server system according to a first embodiment of the present invention.

In the following description, an "interface unit" may be one or more interfaces. The one or more interfaces may be one or more communication interface devices of the same type (for example, one or more network interface cards (NIC)) or two or more communication interface devices of different types (for example, NIC and host bus adapter (HBA)).

In the following description, a "storage unit" is one or more memory devices and may typically be a main storage device. At least one memory in the storage unit may be a volatile memory or a nonvolatile memory. The non-volatile memory is, for example, a hard disk drive (HDD) or a solid state drive (SSD). Furthermore, the storage unit may include a non-transitory storage medium.

In the following description, an "calculation unit" is one or more calculation modules. The at least one calculation module is typically a microprocessor such as a central processing unit (CPU), but may be another type of calculation module such as a graphics processing unit (GPU). A processor as at least one calculation module may be a single core or multi-core processor. The at least one calculation module may be a calculation module in a broad sense such as a hardware circuit (for example, a field-programmable gate array (FPGA) or an application specific integrated circuit (ASIC)) that performs a part or all of the processing.

In addition, the storage unit and the calculation module, or a computer including the storage unit and the calculation module may be virtual. For example, by executing the program in one computer, one or more virtual computers including one or more virtual storage units and one or more virtual calculation modules can be configured.

In the following description, "DB" (database) may be data having any structure. Therefore, "xxxDB" can be referred to as "xxx information". In the following description, the configuration of each DB is an example, and information included in one DB in the following description may be divided into two or more DBs, or information distributed in two or more DBs in the following description may be aggregated in one DB.

In addition, in the following description, a function may be described by an expression of "yyy unit" (excluding an interface unit, a storage unit, and a calculation unit), but the function may be implemented by executing one or more computer programs by a calculation unit, or may be implemented by one or more hardware circuits (for example, FPGA or ASIC). In a case where the function is implemented by executing the program by the calculation unit, a predetermined process is appropriately performed using the storage unit and/or the interface unit, and hence, the function may be at least a part of the calculation unit. The processing described with the function as the subject may be processing performed by a calculation unit or a device including the calculation unit. The program may be installed from a program source. The program source may be, for example, a program distribution computer or a computer-readable recording medium (for example, a non-transitory recording medium). The description of each function is an example, and a plurality of functions may be integrated into one function or one function may be divided into a plurality of functions.

In the following description, the unit of "time" may be year, month, day, hour, minute, and second may be coarser or finer than that or may be a unit different from those.

In addition, in the following description, in a case where the same kind of elements are described without being distinguished, common reference numerals among the reference numerals may be used, and in a case where the same kind of elements are distinguished, individual reference numerals may be used. For example, in a case where the IoT devices are not distinguished from each other, the IoT devices are collectively referred to as "IoT devices 105", and in a case where the IoT devices are distinguished from each other, the IoT devices are referred to as a "IoT devices 105A" and a "IoT device 105B".

Some embodiments of the present invention will be described below with reference to the accompanying drawings.

First Embodiment

FIG. 1 illustrates the configuration of an information processing apparatus according to the first embodiment of the present invention. In the present embodiment, the information processing apparatus is implemented as a client server system. The client server system performs the information processing method described in this specification.

Each of the plurality of data analysis servers 103 (e.g. 103A and 103B) exists as an example of a server that analyzes data, a data collection server 101 exists as an example of a server that collects data from devices, and each of the IoT devices 105 (for example, IoT devices 105A to 105C) exists as an example of a client. Communication is performed between the plurality of data analysis servers 103 and the data collection server 101 via a communication network 102. Communication is performed between the data collection server 101 and each of the plurality of IoT devices 105 via a communication network 104 such as a wireless communication network.

Figure 16:
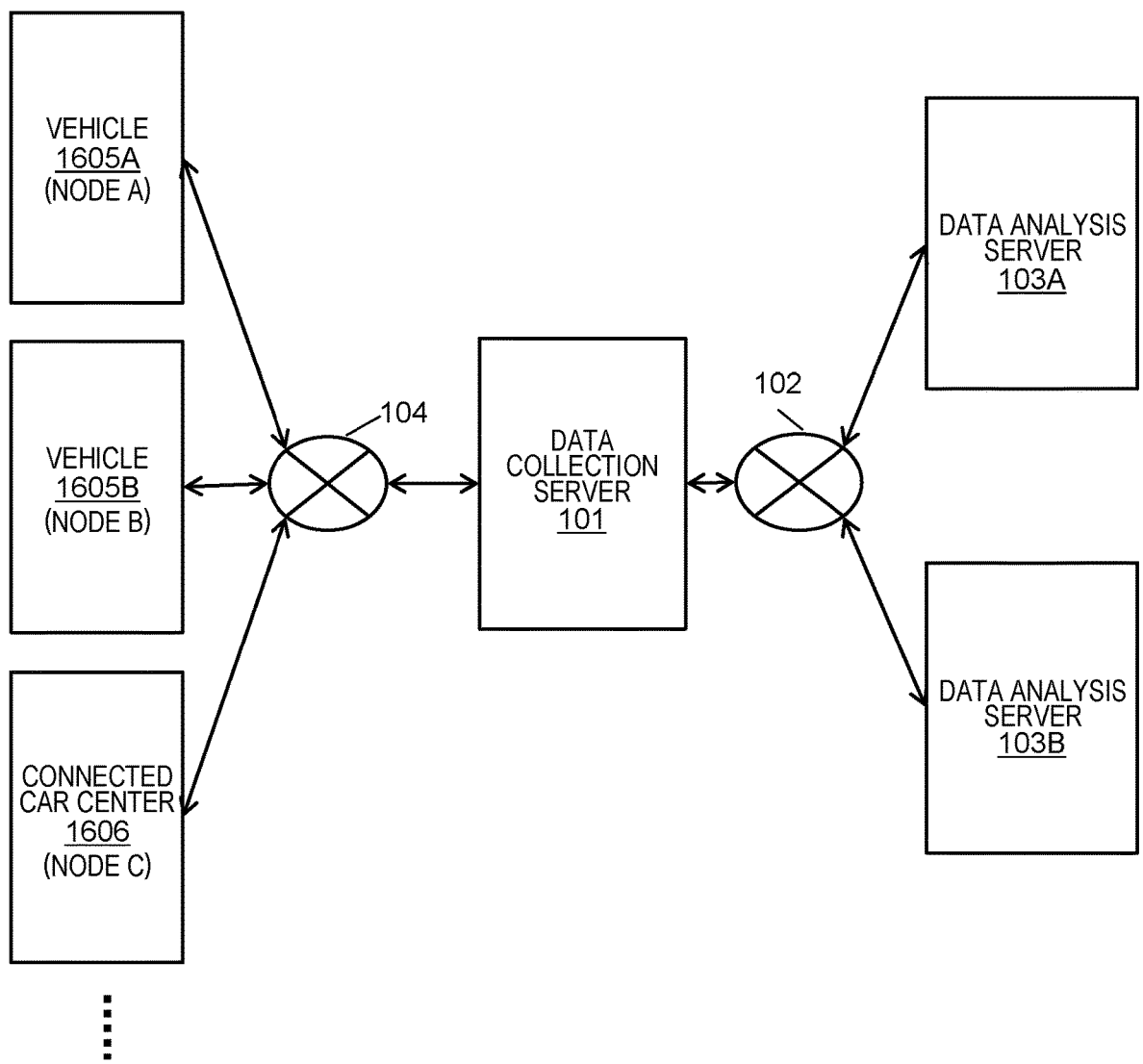
FIG. 16 illustrates the configuration of an automobile system as a specific example of the client server system according to the first embodiment of the present invention.

Various devices can be adopted as the IoT devices 105. For example, as shown in FIG. 16, each IoT device may be a plurality of vehicles 1605 running on a road or may be a connected car center 1606 providing an online service for the vehicles.

Note that, referring to FIG. 1, the wordings "node A", "node B", and "node C" are node IDs (an example of client IDs) allocated to the IoT devices 105.

Figure 2:
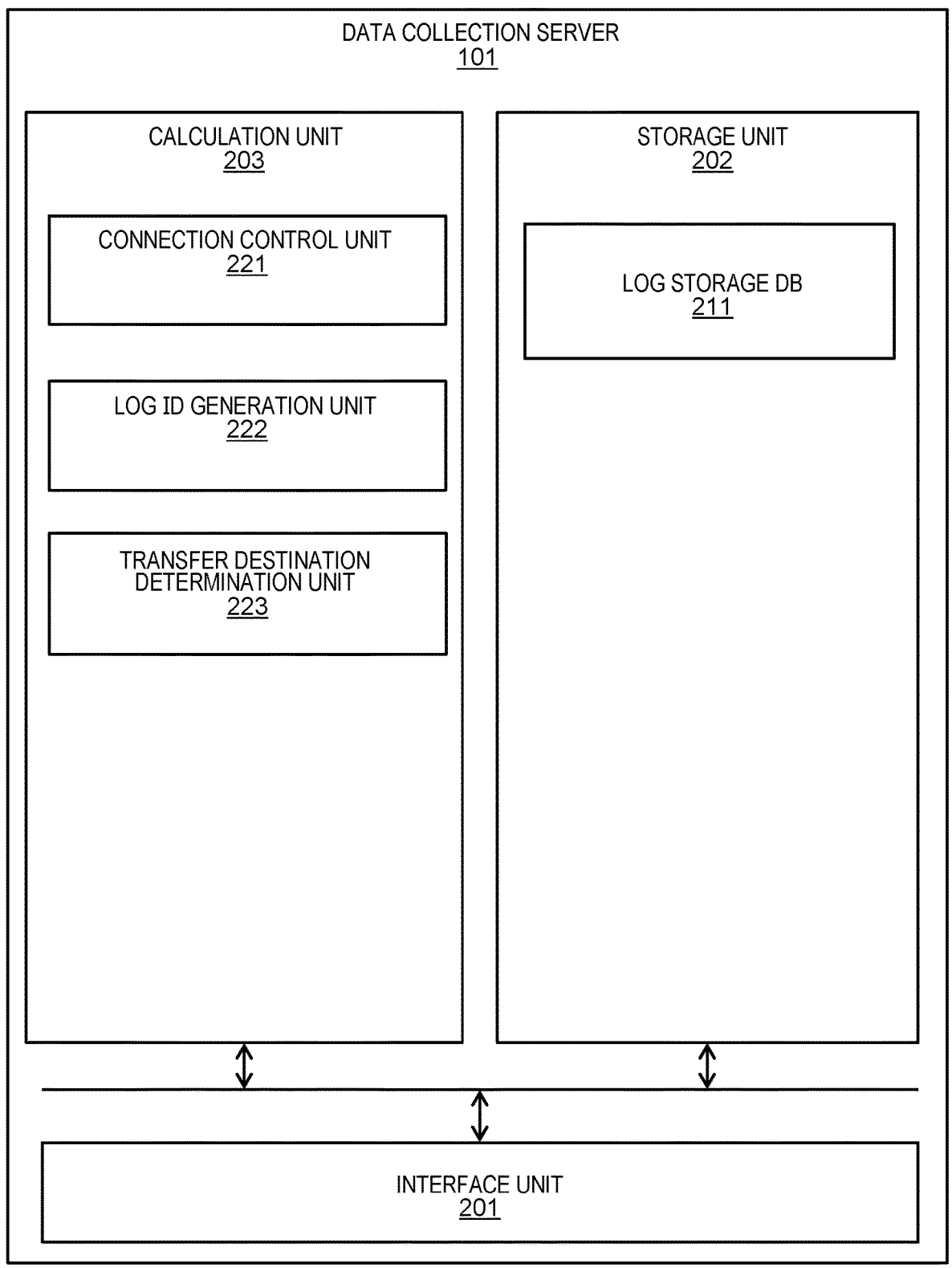
FIG. 2 illustrates the configuration of a data collection server in FIG. 1.

FIG. 2 illustrates the configuration of the data collection server 101.

The data collection server 101 is typically a computer system (one or more computers) and includes an interface unit 201, a storage unit 202, and a calculation unit 203 connected to them.

Communication with the data analysis server 103 and the IoT device 105 is performed via the interface unit 201.

The storage unit 202 stores one or more computer programs executed by the calculation unit 203 and information referred to or updated by the calculation unit 203. The one or more computer programs cause a computer to execute the method described in this specification, thereby causing the computer to function as the data collection server 101. One or more computer programs may be stored in a non-transitory storage medium. Furthermore, a program including this program and other programs to be described later causes a computer system to execute the method described in the present specification, thereby causing the computer system to function as an information processing apparatus.

Functions such as the connection control unit 221, the log ID generation unit 222, and the transfer destination determination unit 223 are implemented by the calculation unit 203 executing one or more computer programs.

In addition, as an example of other information stored in the storage unit 202, there is a log storage DB 211. The details of the log storage DB 211 will be described later.

The connection control unit 221 controls connection with the data analysis server 103 and the IoT device 105.

The log ID generation unit 222 collects log data transmitted from the IoT device 105 and generates a log by assigning a log ID for identifying each piece of log data to the collected log data. That is, the log includes log data and a log ID. The log ID is a unique identifier for identifying each piece of log data. In this manner, the data collection server 101 functions as an ID assigning computer. The log ID may be a number indicating the order of arrival of the log to the data collection server 101, but is not limited thereto.

The transfer destination determination unit 223 determines to which data analysis server 103 the log data transmitted from the IoT device 105 is transferred. The transfer destination is determined according to the transmission source of the log data, contents of the log data, and the like. For this purpose, a rule-based method of determining a transfer destination by applying the transmission source of the log data and contents of the log data to a rule may be employed, but the present invention is not limited to this. The number of data analysis servers 103 as transfer destinations of each piece of log data may be any number of 0 or more.

FIG. 5 illustrates an example of the log storage DB 211. One record is referred to as, for example, a log, and the log includes, for example, a collection time column 501, a log ID column 502, and a log data column 503. One piece of log data transmitted from the IoT device 105 is stored in one field of one record.

The collection time column 501 stores the time when the data collection server 101 has received the log data. The log ID column 502 stores a log ID assigned to the log data by the log ID generation unit 222. The log data column 503 stores log data (which may be referred to as raw data) transmitted from the IoT device 105. The information stored in the log storage DB 211 is not limited to these pieces of information.

Figure 3:
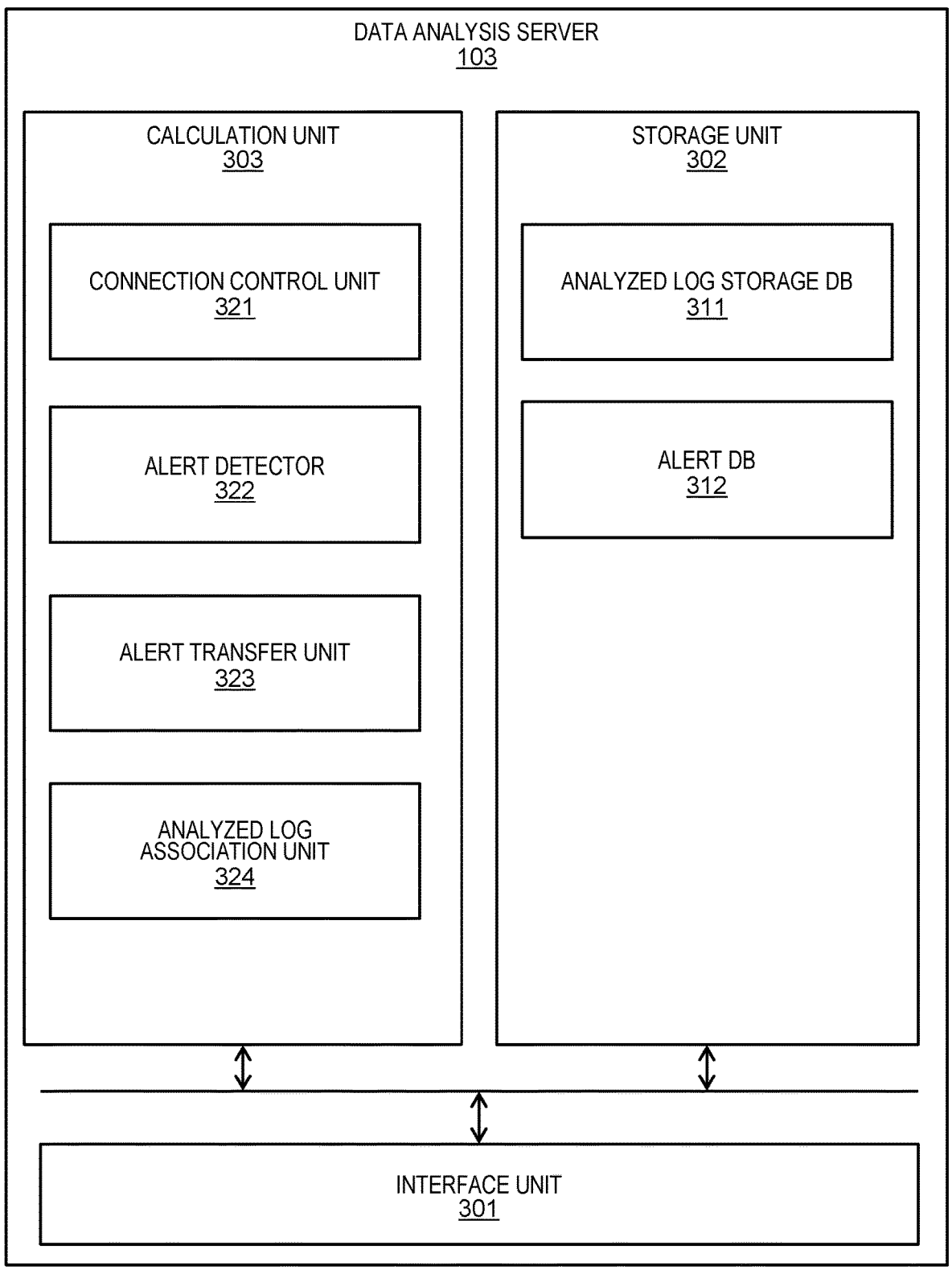
FIG. 3 illustrates the configuration of a data analysis server in FIG. 1.

FIG. 3 illustrates the configuration of the data analysis server 103. The data analysis server 103 functions as a processing computer. For example, the data analysis server 103A is a first processing computer, and the data analysis server 103B is a second processing computer.

The data analysis server 103 is typically a computer system (one or more computers) and includes an interface unit 301, a storage unit 302, and a calculation unit 303 connected to them.

Communication with another data analysis server 103 and data collection server 101 is performed via the interface unit 301.

The storage unit 302 stores one or more computer programs executed by the calculation unit 303 and information referred to or updated by the calculation unit 303. The one or more computer programs cause a computer to execute the method described in this specification, thereby causing the computer to function as the data analysis server 103.

Examples of other information stored in the storage unit 302 include an analyzed log storage DB 311 and an alert DB 312. The details of the analyzed log storage DB 311 and the alert DB 312 will be described later.

Functions such as a connection control unit 321, an alert detector 322, an alert transfer unit 323, and an analyzed log association unit 324 are implemented by the calculation unit 303 executing one or more computer programs.

The connection control unit 321 controls connection with the data collection server 101 and another data analysis server 103.

The alert detector 322 detects an abnormality from the data in the analyzed log storage DB 311 and issues an alert. The method for detecting an abnormality may be a rule based method for determining an abnormality when data matches a certain specific pattern or may be an abnormality detection method for determining an abnormality when data deviates from a normal pattern, but is not limited these methods.

The alert transfer unit 323 transfers the alert issued by the alert detector and the log ID related to the log data determined to be abnormal by the alert detector 322 to another data analysis server 103. One log ID may be forwarded for one alert, or a list including a plurality of log IDs may be forwarded for one alert.

The analyzed log association unit 324 associates an alert transferred by another data analysis server 103 with a log in the analyzed log storage DB 311 and stores the alert in the alert DB 312. The details of the analyzed log association unit 324 will be described later.

FIG. 6 illustrates an example of the analyzed log storage DB 311. A collection time column 601 stores the time when the data collection server 101 has received the log data from the IoT device 105. A log ID column 602 stores a log ID assigned to the log data by the data collection server.

The other columns in the analyzed log storage DB 311 store information acquired as a result of analysis. For example, in the present embodiment, a VIN column 603 stores the identifier VIN of the vehicle that is the transmission source of the log data. An ECU column 604 stores the type of ECU that has generated the log data. An engine RPM column 605 stores the engine RPM described in the log data. The information stored in the analyzed log storage DB 311 is not limited these pieces of information. In addition, the upper limit (maximum number of records) of the number of records stored in the analyzed log storage DB 311 can be set to, for example, 5 as illustrated in the drawing, but this upper limit can be appropriately changed.

Figures 7, 8:
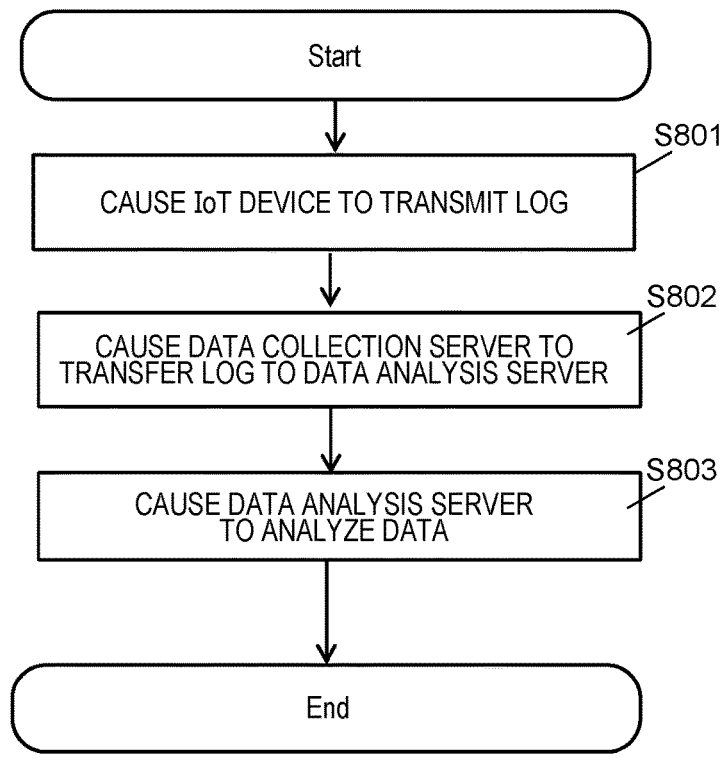
FIG. 7 illustrates the configuration of an alert DB.
FIG. 8 illustrates an outline of a procedure of log processing according to the first embodiment of the present invention.

FIG. 7 illustrates an example of the alert DB 312. The detection time column 701 stores the time when the alert detector 322 has detected an abnormality. The alert ID column 702 stores a unique identifier assigned to the detected alert. The alert content column 703 stores the content of the detected alert, that is, the detection result of the abnormality. The relation log column 704 stores the log ID of a log that has caused alert issuance or a list thereof. Note that the information stored in the alert DB 312 is not limited to these pieces of information.

Figure 4:
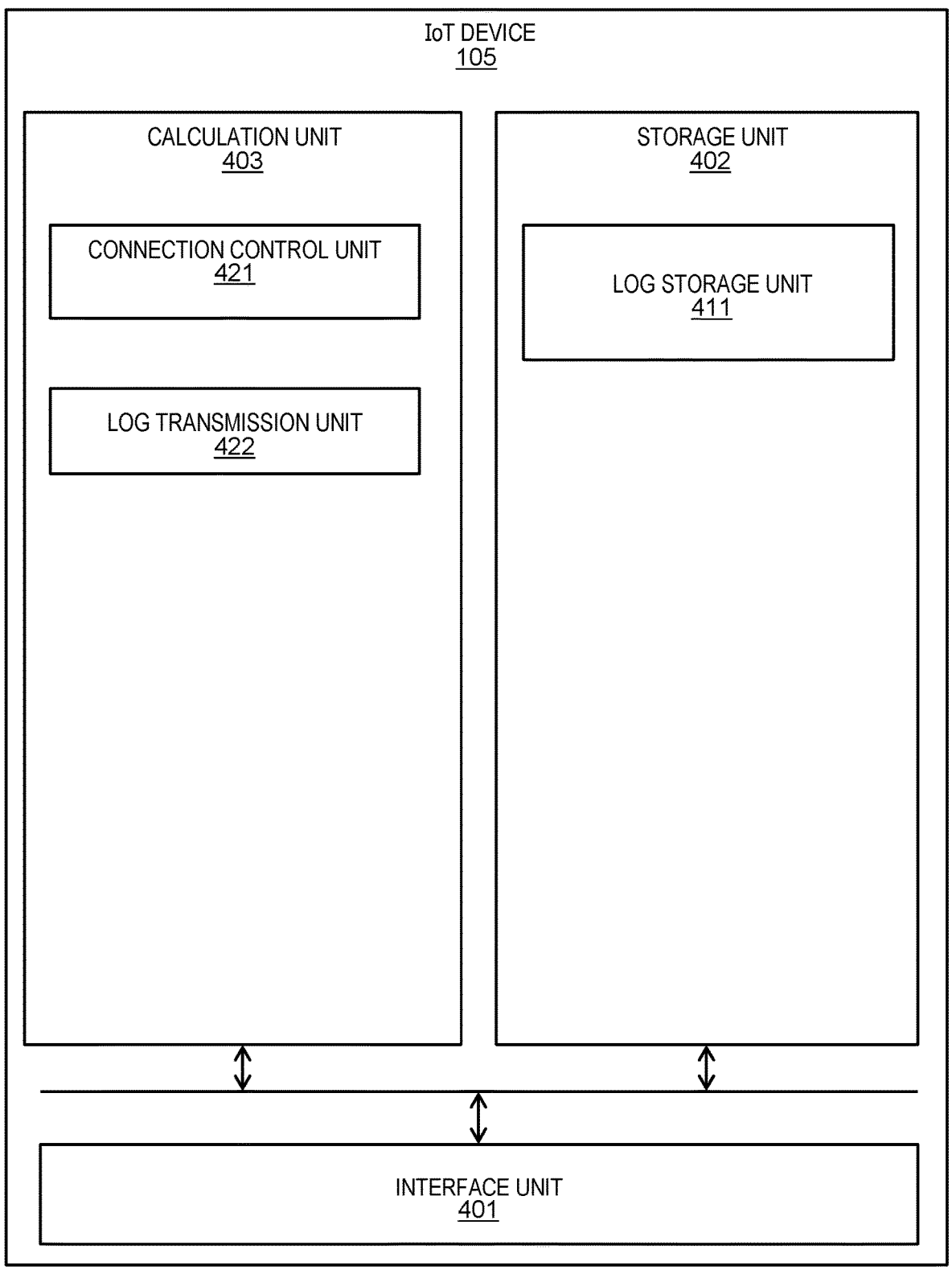
FIG. 4 illustrates the configuration of an IoT device in FIG. 1.

FIG. 4 illustrates the configuration of the IoT device 105.

The IoT device 105 includes an interface unit 401, a storage unit 402, and a calculation unit 403 connected to them.

Communication with the data collection server 101 is performed via the interface unit 401.

The storage unit 402 stores one or more computer programs executed by the calculation unit 403 and information referred to or updated by the calculation unit 403. The one or more computer programs cause a computer to execute the method described in the present specification, thereby causing the computer to function as the IoT device 105. In addition, the storage unit 402 includes a log storage unit 411.

Functions such as a connection control unit 421 and a log transmission unit 422 are implemented by the calculation unit 403 executing one or more computer programs. The connection control unit 421 controls connection with the data collection server 101. The log transmission unit 422 transmits the log in the log storage unit 411 to the data collection server 101.

FIG. 8 illustrates an outline of a series of procedures from when the IoT device 105 according to the present embodiment transmits a log to when the data analysis server 103 analyzes the log. The information processing method according to the present embodiment includes the steps illustrated in FIG. 8.

In a case where data to be transmitted is generated, the IoT device 105 stores the data in the log storage unit 411 as log data and transmits the log data to the data collection server 101 by the log transmission unit 422 (S801).

The data collection server 101 transfers the received log to the data analysis server 103 (S802). The details of S802 will be described later.

The data analysis server 103 analyzes the received log (S803). The details of S803 will be described later.

Figure 9:
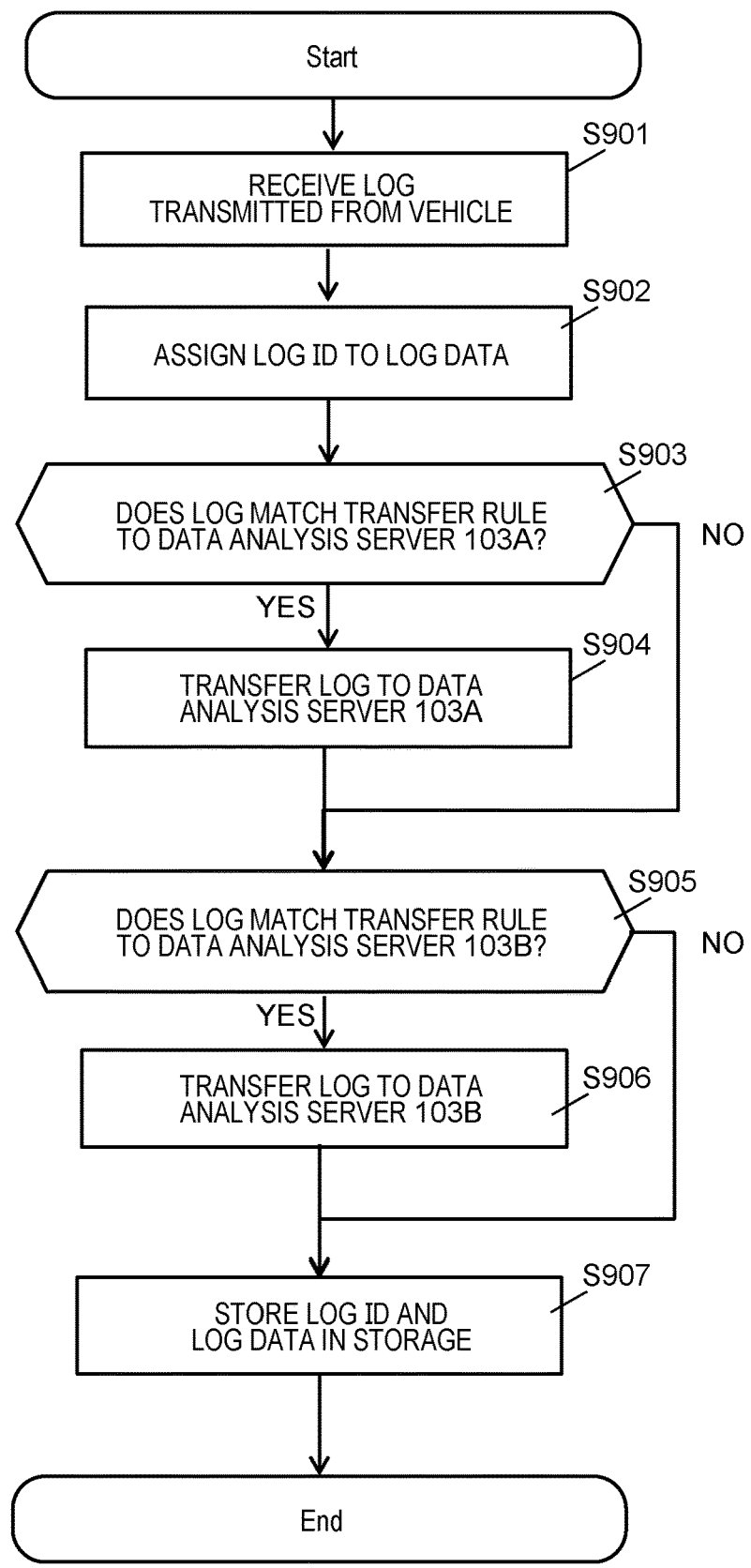
FIG. 9 illustrates an outline of a procedure of processing at the time of log transfer of a log collection server according to the first embodiment of the present invention.

FIG. 9 illustrates the details of S802 and an outline of a procedure of data transfer by the data collection server 101.

The connection control unit 221 of the data collection server 101 receives the data transmitted from the log transmission unit 422 of the IoT device 105 (S901). The log ID generation unit 222 of the data collection server 101 generates a log ID to be assigned to the received data (S902).

The transfer destination determination unit 223 of the data collection server 101 determines whether the log matches the transfer rule to the data analysis server 103A (S903). If they do not match, the process proceeds to S905. If they match, the log (including the log data and the log ID) is transferred to the data analysis server 103A (S904), and the process proceeds to S905.

The transfer destination determination unit 223 of the data collection server 101 determines whether the log matches the transfer rule to the data analysis server 103B (S905). If they do not match, the process proceeds to S907. If they match, the log (including the log data and the log ID) is transferred to the data analysis server 103B (S906), and the process proceeds to S907. The data collection server 101 stores the log ID and the log in the log storage DB 211 (S907).

Figure 10:
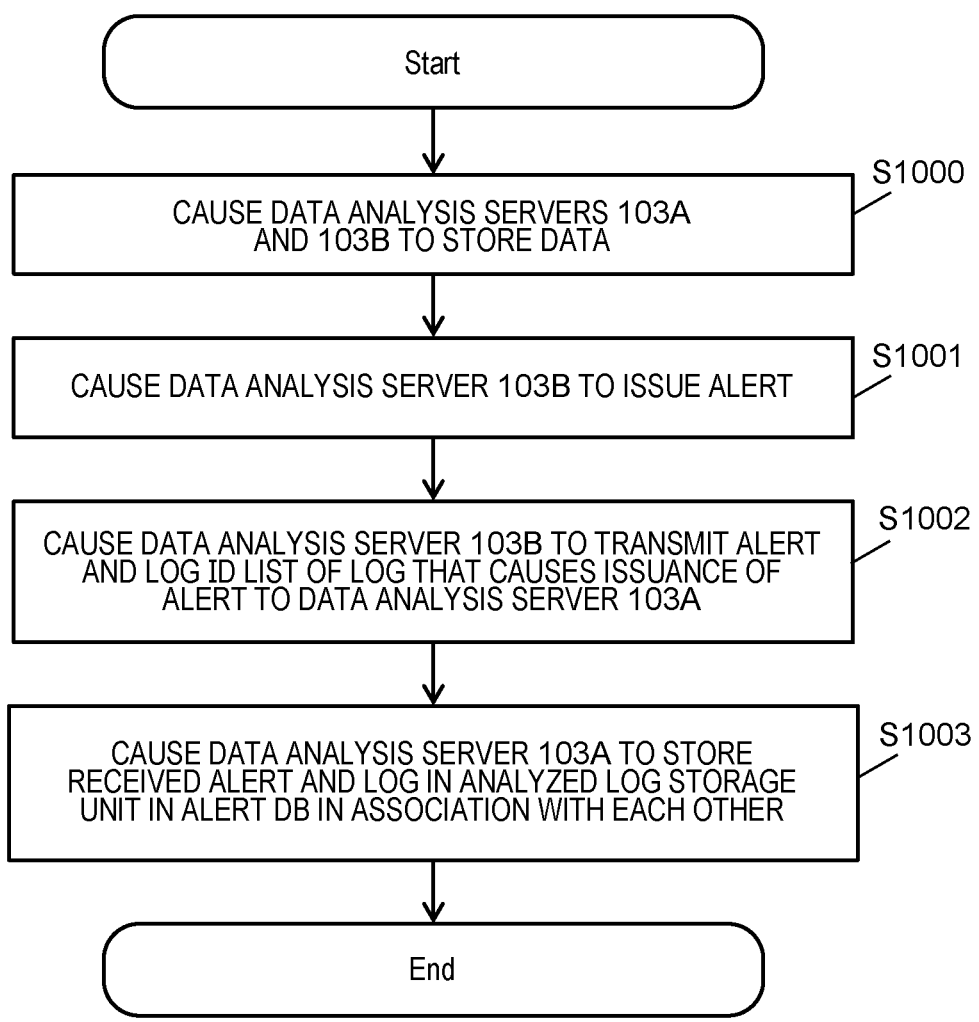
FIG. 10 illustrates an outline of a procedure of processing at the time of issuing an alert according to the first embodiment of the present invention.

FIG. 10 illustrates the details of S803 and an outline of a procedure of analysis of data in the data analysis server 103 and sharing of an alert between the data analysis servers.

The data analysis servers 103A and 103B store the logs (including the log data and the log ID) received from the data collection server 101 in the analyzed log storage DB 311 of the storage unit 302 (S1000). Although a specific format of the stored data can be designed as appropriate, for example, as illustrated in FIG. 6, a record is configured by extracting a field for each item included in the log data.

As described above, the log transmitted from the data collection server 101 to the data analysis server 103A and the log transmitted from the data collection server 101 to the data analysis server 103B may not be the same.

The alert detector 322 of the data analysis server 103B detects a set (log set) of logs related to log data indicating abnormality from the analyzed log storage DB 311 and issues an alert (S1001). For example, the alert detector 322 detects an abnormality based on the log data.

The alert transfer unit 323 of the data analysis server 103B transmits the log ID of the log data in which the abnormality is detected (for example, a list of log IDs included in the log set) and the alert (detection result of the abnormality) to the data analysis server 103A in association with each other (S1002). The detection result of the abnormality includes, for example, the content or type of the abnormality. The detection result of the abnormality may include the detection time.

The analyzed log association unit 324 of the data analysis server 103A stores the log data stored in the data analysis server 103A and the received detection result in the alert DB 312 in association with each other on the basis of the log ID (for example, a list of log IDs) received from the data analysis server 103B (S1003).

As an example of a method in which the analyzed log association unit 324 associates and stores the detection result of the abnormality and the log in S1003, there is a method in which a log ID list is stored in the relation log column of the alert DB 312 as illustrated in FIG. 7, and each log ID in the log ID list is linked with a log ID in the log ID column of the analyzed log storage DB 311. However, the method of associating is not limited to this.

In the present embodiment, since both the data analysis servers 103A and 103B use the common log ID assigned by the data collection server 101, the log data stored in the data analysis server 103A and the detection result received from the data analysis server 103B can be associated with each other via the log ID. In this case, the association can be implemented simply by storing the log ID.

More specifically, in a case where any of the records in the analyzed log storage DB 311 illustrated in FIG. 6 and any of the records in the alert DB 312 illustrated in FIG. 7 include the same log ID, it can be said that the former log data is associated with the latter detection result.

Note that the timing at which the alert transfer unit 323 transfers the detection result of the abnormality in S1002 may be immediately after the alert detection in S1001 or after a while from the alert detection. In the latter case, for example, transfer is performed at the time of batch processing at the fixed time.

By storing the detection result of the abnormality in the alert DB 312 in association with the data in the analyzed log storage DB 311, the data analysis server 103A can analyze the abnormality detected by the data analysis server 103B in association with the log that has generated the alert. This makes it possible to perform more effective and efficient data analysis.

In this way, information about alerts can be efficiently shared among a plurality of systems. In particular, different designers can efficiently coordinate multiple SIEM systems.

In the first embodiment described above, the functions of the data analysis server 103A and the data analysis server 103B may be replaced with each other. In addition, one or more of the plurality of data analysis servers 103 may have the functions of both the data analysis servers 103A and 103B.

The data analysis server 103 may output some or all of the contents of the alert DB 312 after S1003. For example, the data may be transmitted to an external computer (another data analysis server 103 or another computer) via the connection control unit 321 or may be output via an output device (not illustrated) (a display device, a printer, or the like).

Second Embodiment

The second embodiment will be described. At that time, differences from the first embodiment will be mainly described, and a description of common points with the first embodiment will be omitted or simplified.

Figure 11:
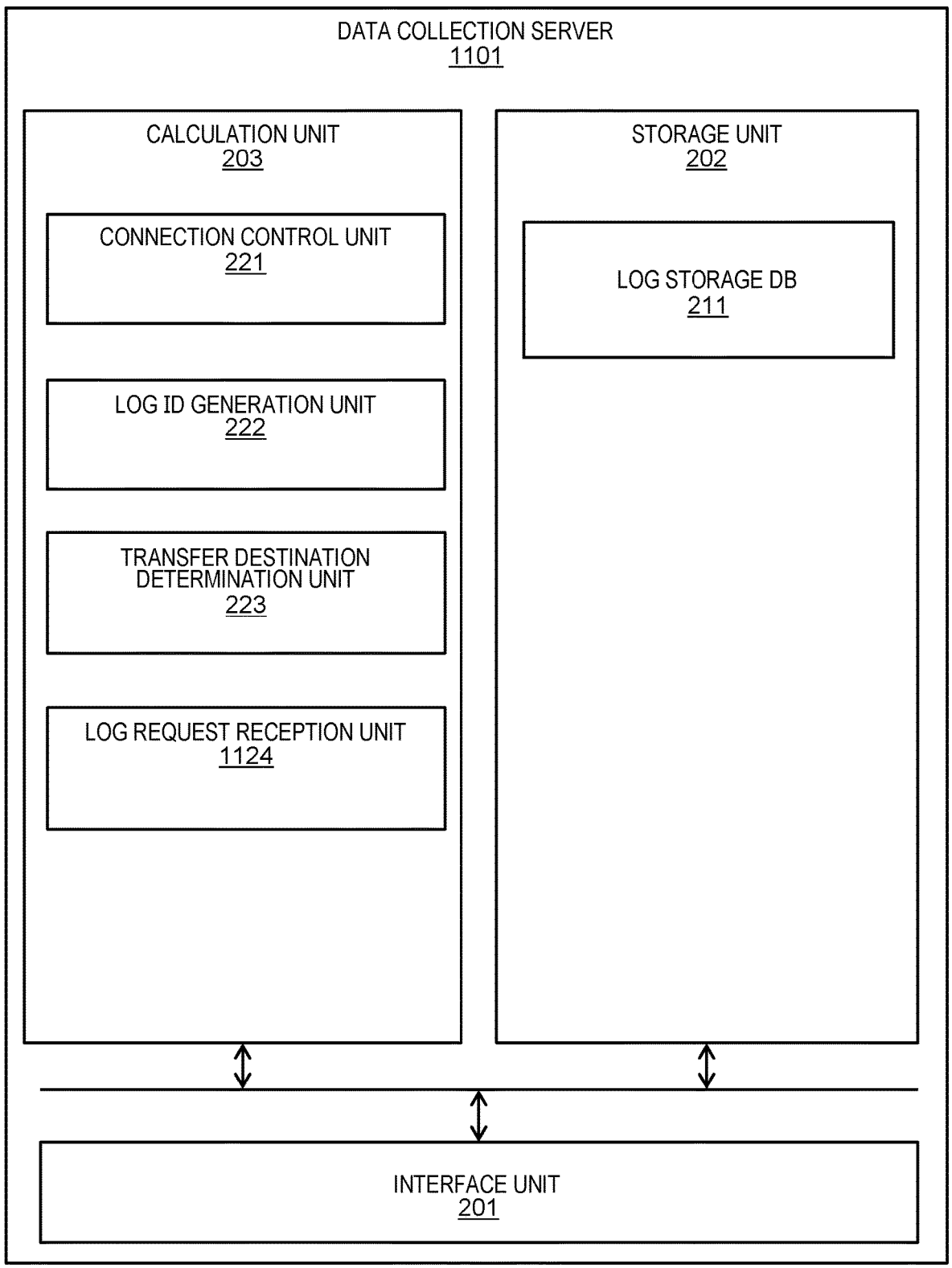
FIG. 11 illustrates the configuration of a data collection server according to a second embodiment of the present invention.

FIG. 11 illustrates an example of the data collection server. A data collection server 1101 includes a log request reception unit 1124 in a calculation unit in addition to the data collection server 101 in FIG. 2.

The log request reception unit 1124 receives a log ID list from the data analysis server, extracts a log having a log ID in the log ID list from a log storage DB 211, and transmits a set of the extracted logs to a data analysis server 1203.

Figure 12:
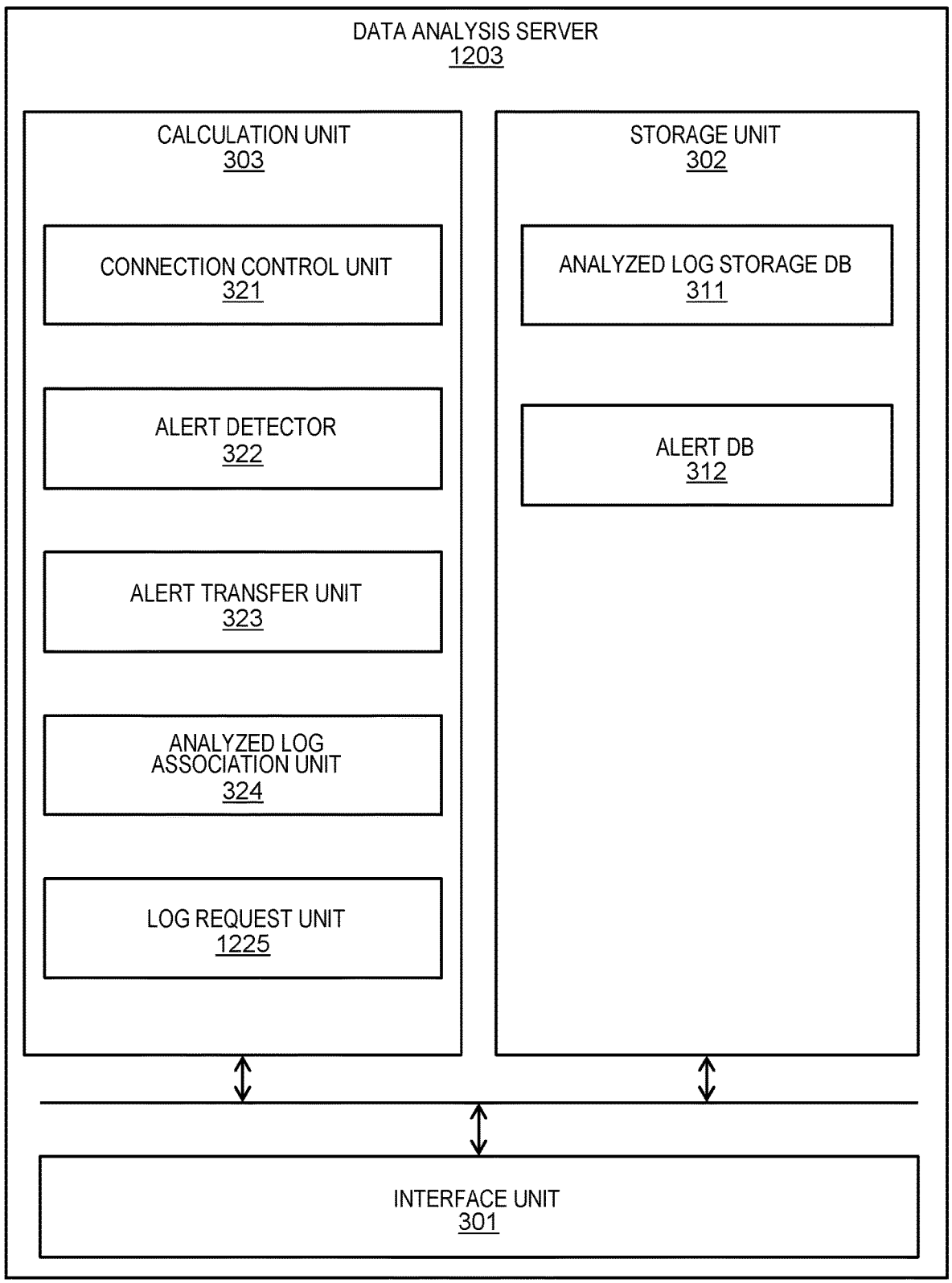
FIG. 12 illustrates the configuration of a data analysis server according to the second embodiment of the present invention.

FIG. 12 illustrates an example of a data analysis server. The data analysis server 1203 includes a log request unit 1225 in addition to a data analysis server 103 in FIG. 3.

When log data corresponding to any log ID is not stored for the log ID (for example, the format of the log ID list) received from another data analysis server 1203 in association with the detection result of an abnormality, the log request unit 1225 executes a process (log request process) of requesting the log data. For example, an analyzed log association unit 324 requests a log by transmitting a log ID list including a log ID that cannot be associated with the log in an analyzed log storage DB 311 to the data collection server 1101.

Figure 13:
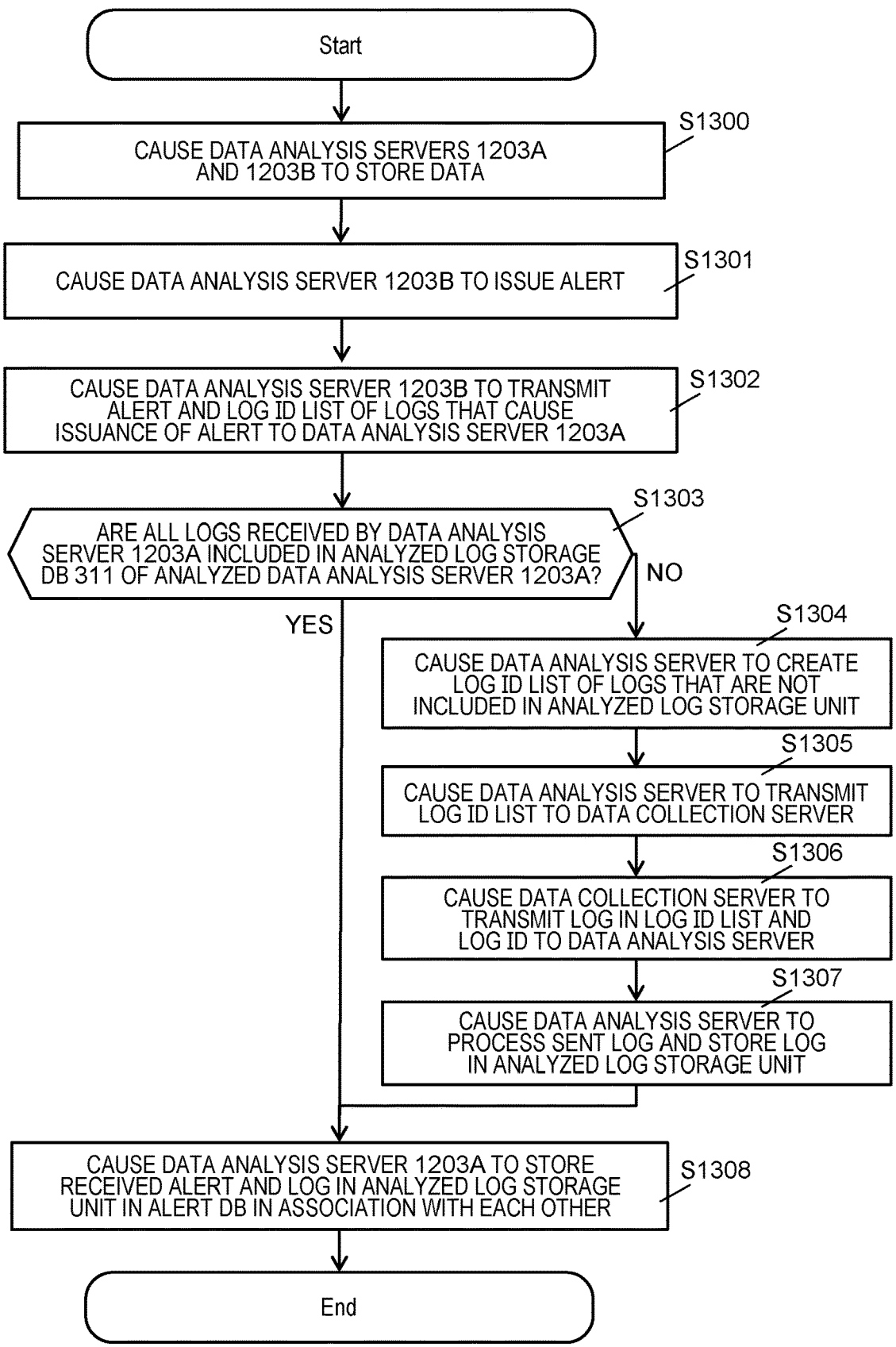
FIG. 13 illustrates an outline of a procedure of processing at the time of issuing an alert according to the second embodiment of the present invention.

FIG. 13 illustrates the details of S803 in the embodiment and an outline of a procedure of analysis of data in the data analysis server and sharing of an alert between the data analysis servers.

In S1300, S1301, and S1302, processes similar to S1000, S1001, and S1002 are performed, respectively. The data analysis server 1203A checks whether all logs having the same log IDs as the log IDs of the log ID list received in S1302 are stored in the analyzed log storage DB 311 (S1303).

If all the logs are stored in S1303, the process proceeds to S1308.

If not all the logs are stored in S1303, the log request unit of a data analysis server 1203A creates a list of log IDs of logs not stored (S1304) and transmits the log ID list to the data collection server 1101 (S1305). This corresponds to the log request process.

The log request reception unit 1124 of the data collection server 1101 extracts logs having the same log IDs as the log IDs of the received log ID list from the log storage DB 211 and transmits a set of the extracted logs to the data analysis server 1203A (S1306). The data analysis server 1203A processes the received set of logs and stores the processed set in the analyzed log storage DB 311 (S1307).

Finally, in S1308, processing similar to that in S1003 in FIG. 10 is performed.

The timing at which the log request unit creates the log ID list in S1304 may be immediately after S1303 or may be after a while. In the latter case, for example, the processing is performed at the time of batch treatment at the fixed time.

According to the second embodiment, even in a case where the analyzed log storage DB 311 does not hold the log that has generated an alert when the data analysis server 1203A transfers the alert from another data analysis server 1203B, it is possible to collect the insufficient log from the data collection server 1101 and analyze the alert.

Third Embodiment

The third embodiment will be described. At that time, differences from the second embodiment will be mainly described, and a description of common points with the second embodiment will be omitted or simplified.

In a log request process, a log request unit 1225 of a data analysis server 1203 according to the third embodiment transmits the detection result of the abnormality detected based on each log to the data collection server in addition to the log ID list received from another data analysis server 1203.

Figure 14:
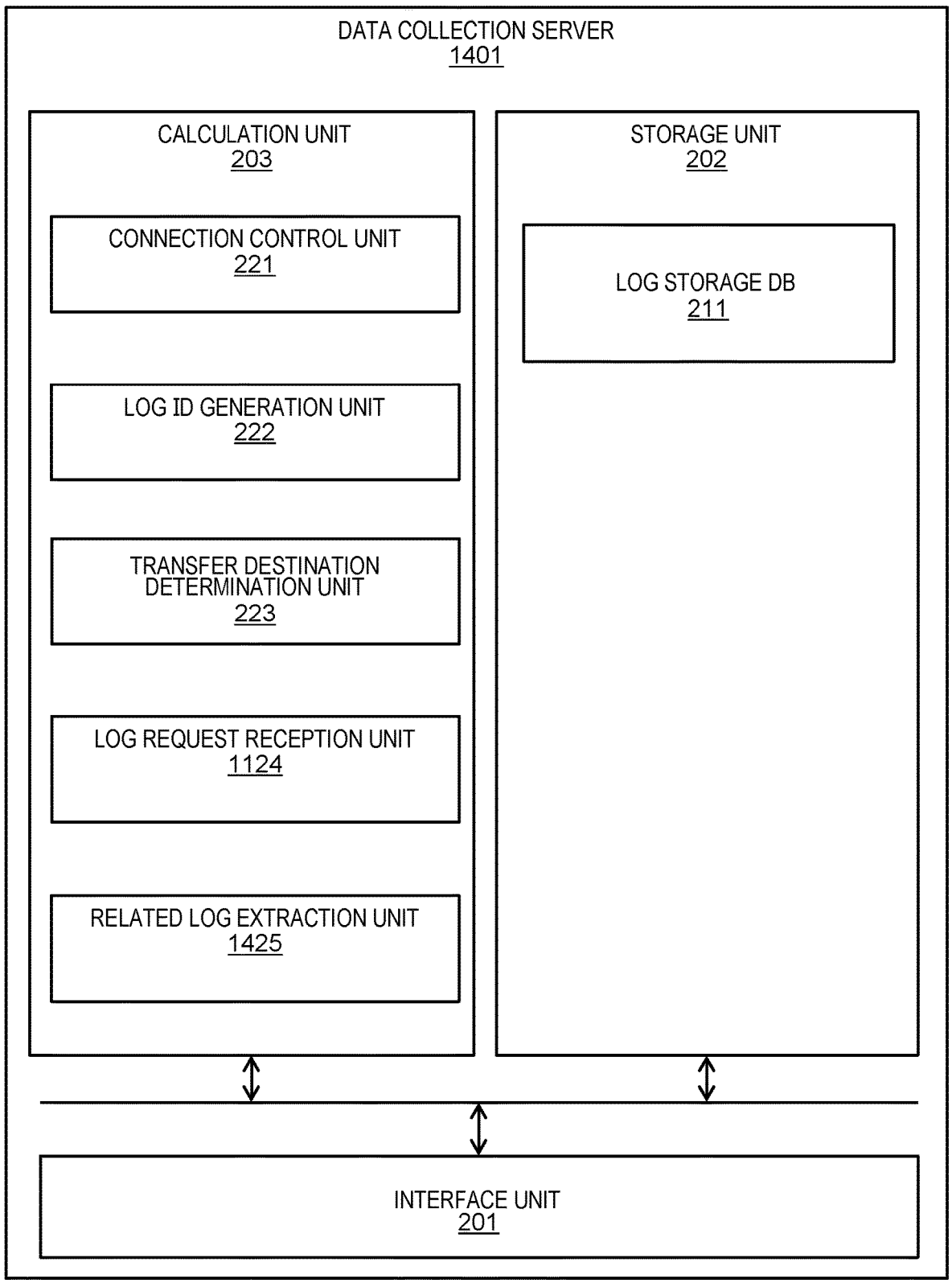
FIG. 14 illustrates the configuration of a data collection server according to the third embodiment of the present invention.

FIG. 14 illustrates an example of the data collection server. A data collection server 1401 includes a related log extraction unit 1425 in a calculation unit in addition to the data collection server 1101 in FIG. 11.

The related log extraction unit 1425 receives a detection result of an abnormality from a log request reception unit 1124, extracts a log possibly related to the detection result from the log storage DB 211, and returns a list of log IDs of the extracted log (related log ID list) to the log request reception unit 1124. As a method of extracting a log that may be related to a detection result, there is a method of extracting one or more logs (for example, based on the log ID, according to a predefined rule for each content of the alert,) according to the detection result, but the method is not limited to this.

A specific example will be described. For example, when the detection result indicates an abnormality in the controller area network (CAN) of a vehicle, a log related to the CAN in a predetermined range before and after the detection time among logs of the vehicle is extracted as a log that may be related to the detection result. In addition, for example, in a case where the detection result indicates an abnormality in the log from the connected car center, all the vehicles related to the log in which the abnormality is detected are specified, logs in a predetermined range before and after the detection time among the logs related to any of the specified vehicles are set as a search range, and a log that may be related to the detection result is extracted from the search range.

The log request reception unit 1124 receives the detection result and the log ID list from the data analysis server 1203 and passes them to the related log extraction unit 1425. Then, the related log ID list returned from the related log extraction unit 1425 and a set of logs obtained by extracting logs having log IDs included in the related log ID list from the log storage DB 211 are transmitted together to the data analysis server 1203.

As described above, in response to a log request process from the data analysis server 1203, the related log extraction unit 1425 extracts the log data to be transmitted from the collected log data of the device on the basis of the received log ID and the detection result and transmits the extracted log data to the data analysis server 1203.

Figure 15:
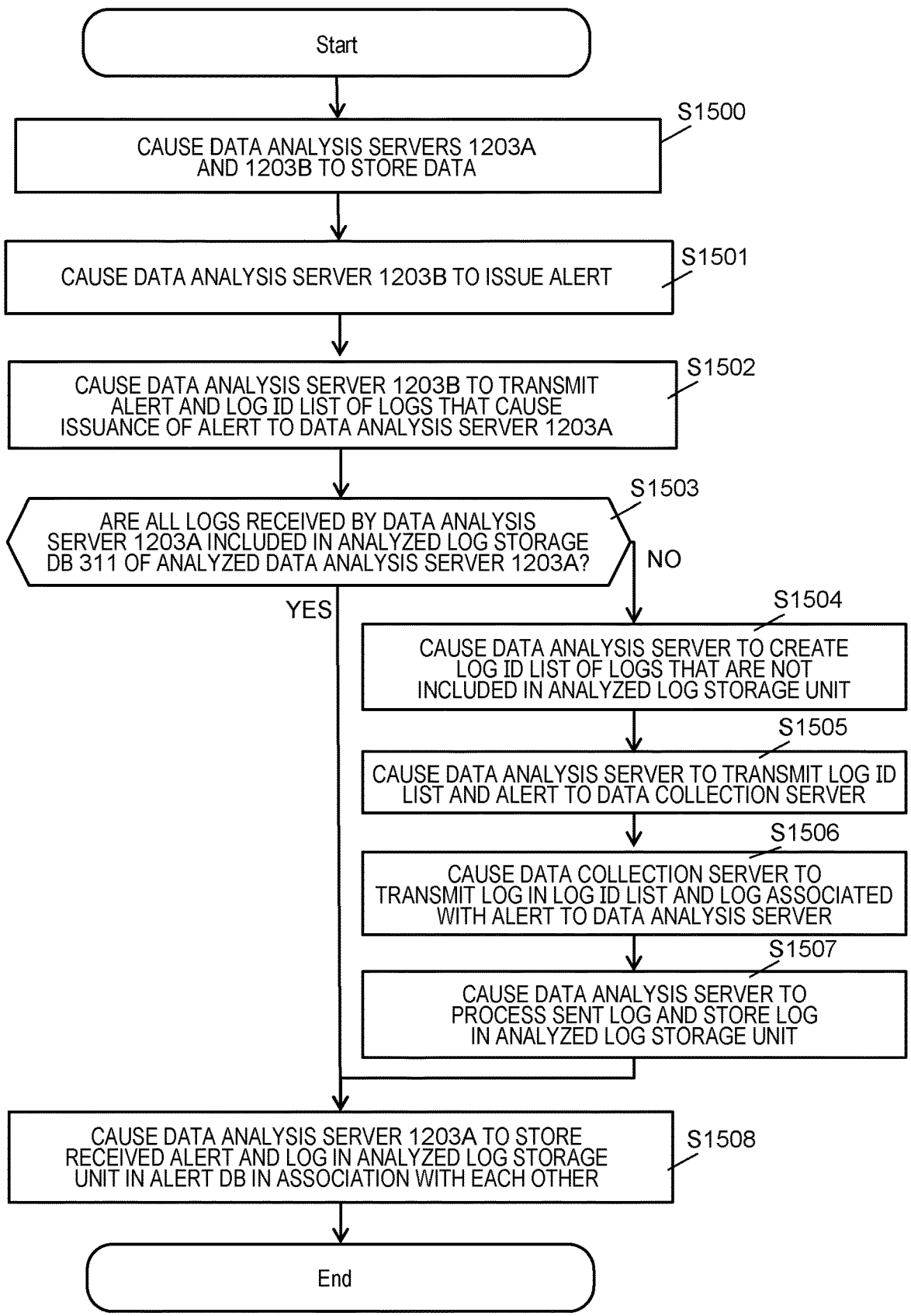
FIG. 15 illustrates an outline of a procedure of processing at the time of issuing an alert according to the third embodiment of the present invention.

FIG. 15 illustrates the details of S803 in the embodiment and an outline of a procedure of data analysis in the data analysis server 1203 and sharing of an alert between the data analysis servers.

In S1500, S1501, S1502, S1503, and S1504, processes similar to S1300, S1301, S1302, S1303, and S1304 in FIG. 13 are performed.

In S1505, the log request unit 1225 of the data analysis server 1203A transmits the detection result of the abnormality and the log ID list to the data collection server 1101 (S1505).

The log request reception unit 1124 of the data collection server 1401 receives the detection result and the log ID list from the data analysis server 1203 and passes them to the related log extraction unit 1425. Then, the related log ID list returned from the related log extraction unit 1425 and a set of logs obtained by extracting logs having log IDs included in the related log ID list from the log storage DB 211 are transmitted together to the data analysis server 1203A (S1506).

In steps S1507 and S1508, processes similar to those in steps S1307 and S1308 in FIG. 13 are performed.

According to the third embodiment, even in a case where the analyzed log storage DB 311 does not hold the log that has caused the detection (the log that has generated the alert) when the detection result of the abnormality is transferred to the data analysis server 1203A from another data analysis server 1203B, it is possible to collect the insufficient log and the log that may be related to the alert from the data collection server 1401 and analyze the alert.

Fourth Embodiment

The fourth embodiment will be described. At that time, differences from the second and third embodiments will be mainly described, and a description of common points with the second and third embodiments will be omitted or simplified.

Figure 17:
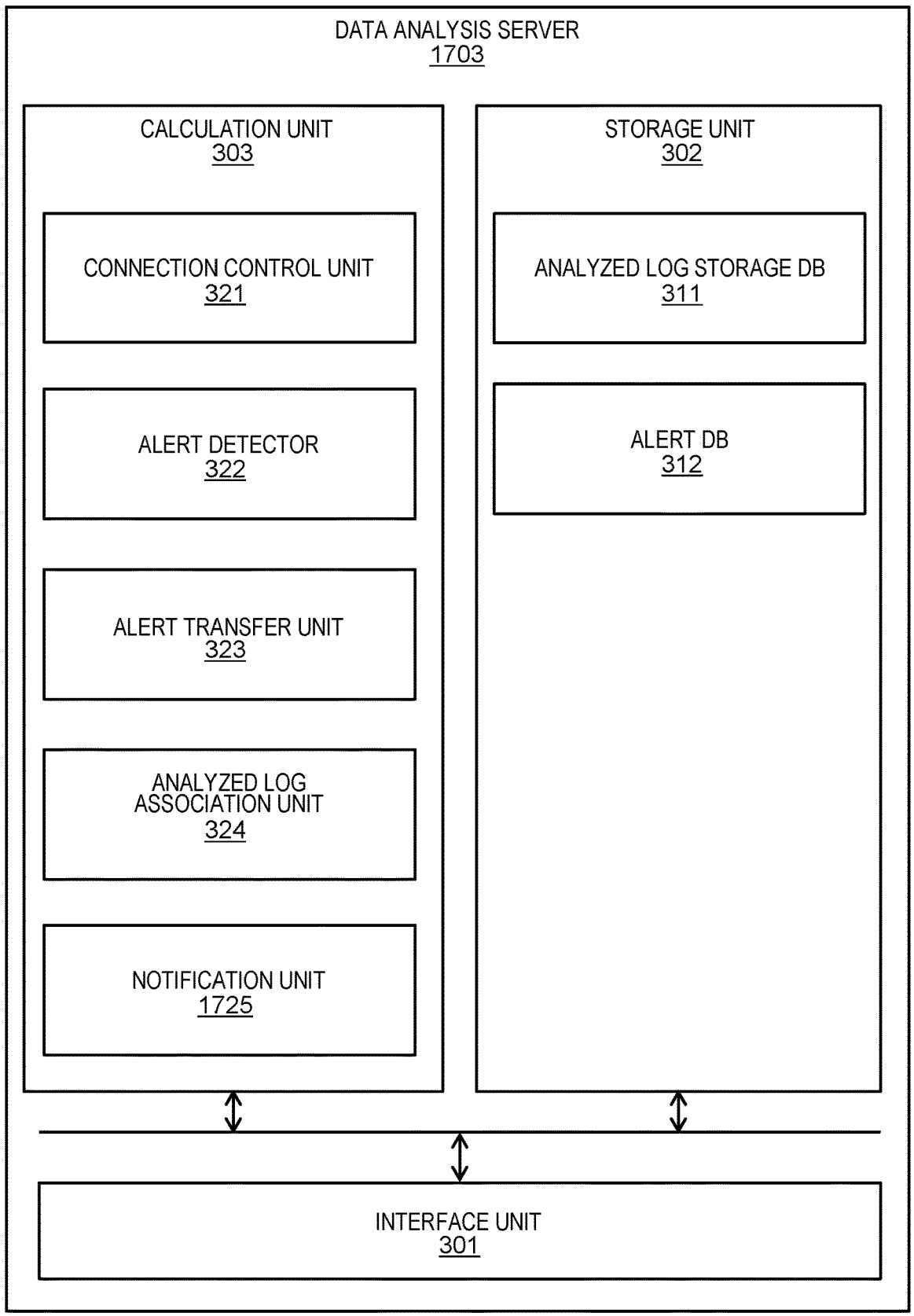
FIG. 17 illustrates the configuration of a data analysis server according to a modification of the first embodiment of the present invention.

FIG. 17 illustrates an example of a data analysis server. The data analysis server 1703 includes a notification unit 1725 in addition to the data analysis server 1203 in FIG. 12.

The data analysis server 1703 notifies the detection result of the abnormality to the outside prior to a log request process.

That is, the log request process is executed after the detection result is notified to the outside.

The notification timing can be, for example, after S1301 and before S1303 in FIG. 13.

Although specific processing of a notification can be designed as appropriate, for example, an alert may be transmitted to an external computer via the connection control unit 321, or an alert may be output via an output device (not illustrated) (a display device, a printer, or the like). In the case of using a display device, output can be executed via a GUI.

The contents of a transmitted or output alert can also be designed as appropriate, and can include, for example, information (message or the like) indicating that the alert has been detected, the detection time of an abnormality, the alert ID, the alert contents, and the log ID of the log that has caused the alert to be issued or a list thereof.

According to the fourth embodiment, since the alert content can be output early before data transmission and reception between the data analysis servers is performed, an external alert processing system or a person (human) in charge of processing an alert can recognize the alert early. This effect is particularly remarkable when data transmission and reception between the data analysis servers is performed by batch processing, and an alert can be recognized without waiting for the execution of batch processing at the fixed time.

REFERENCE SIGNS LIST

101 data collection server
102 communication network
103 data analysis server
104 communication network
105 IoT device
201 interface unit
202 storage unit
203 calculation unit
211 log storage unit DB
221 connection control unit
222 log ID generation unit
223 transfer destination determination unit
301 interface unit
302 storage unit
303 calculation unit
311 analyzed log storage DB
312 alert DB
321 connection control unit
322 alert detector
323 alert transfer unit
324 analyzed log association unit
401 interface unit
402 storage unit
403 calculation unit
411 log storage unit
421 connection control unit
422 log transmission unit
501 collection time column
502 log ID column
503 log data column
601 collection time column
602 log ID column
603 VIN column
604 ECU column 605 engine RPM column
701 detection time column
702 alert ID column
703 alert content column
704 relation log column
1101 data collection server
1124 log request reception unit
1203 data analysis server
1225 log request unit
1401 data collection server
1425 related log extraction unit
1605 vehicle
1606 connected car center
1703 data analysis server
1725 notification unit All publications, patents, and patent applications cited herein are hereby incorporated by reference in their entirety.

The invention claimed is:

1. An information processing apparatus comprising:
   an ID assigning computer that assigns a log ID to collected log data of a device;
   a first processing computer that stores the log data and the log ID and detects an abnormality based on the log data; and
   a second processing computer that stores the log data and the log ID, detects an abnormality based on the log data, and transmits the log ID of the log data in which the abnormality is detected and a detection result of the abnormality to the first processing computer, wherein
   the first processing computer stores the log data stored in the first processing computer and the received detection result in association with each other based on the log ID received from the second processing computer.

2. The information processing apparatus according to claim 1, wherein the first processing computer executes a log request process of requesting the log data when the log data corresponding to the log ID received from the second processing computer is not stored.

3. The information processing apparatus according to claim 2, wherein the first processing computer transmits the log ID and the detection result received from the second processing computer in the log request process.

4. The information processing apparatus according to claim 3, wherein
   the log request process is performed for the ID assigning computer, and
   the ID assigning computer extracts log data to be transmitted from the collected log data of the device based on the log ID and the detection result in response to the log request process and transmits the extracted log data to the first processing computer.

5. An information processing method comprising:
   a step of causing an ID assigning computer to assign a log ID to collected log data of a device;
   a step of causing a first processing computer to store the log data and the log ID;
   a step of causing the first processing computer to detect an abnormality based on the log data;
   a step of causing a second processing computer to store the log data and the log ID;
   a step of causing the second processing computer to detect an abnormality based on the log data;
   a step of causing the second processing computer to transmit the log ID of the log data in which an abnormality is detected and a detection result of the abnormality to the first processing computer; and
   a step of causing the first processing computer to store the log data stored in the first processing computer and the received detection result in association with each other based on the log ID received from the second processing computer.

6. A non-transitory storage medium storing a program for causing a computer system to execute the method defined in claim 5.

* * * * *